UNITED STATES PATENT OFFICE.

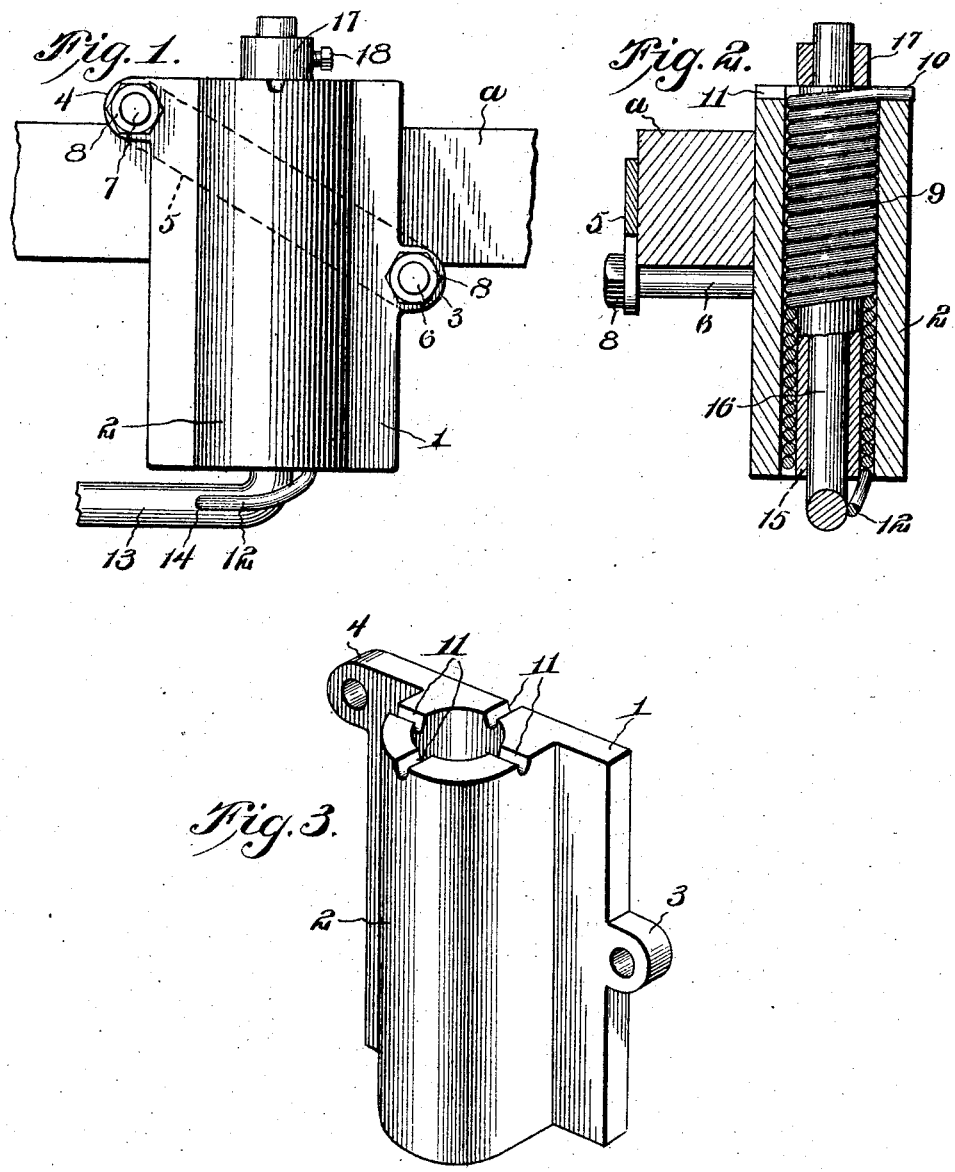

IRVING G. HARKER, OF DODGEVILLE, WISCONSIN.

STUBBLE-TURNER.

No. 849,995.  Specification of Letters Patent.  Patented April 9, 1907.

Application filed January 19, 1907. Serial No. 353,132.

*To all whom it may concern:*

Be it known that I, IRVING G. HARKER, a citizen of the United States of America, residing at Dodgeville, in the county of Iowa and State of Wisconsin, have invented new and useful Improvements in Stubble-Turners, of which the following is a specification.

This invention relates to stubble-turners designed for attachment to the beam of an ordinary plow, and the purpose of the same being to turn the stubbles downward against the ground in advance of the moldboard.

One of the principal objects of my invention is to provide a stubble-turner which can be applied to any plow-beam and which will adjust itself to the varying depths of the furrow.

Another object of the invention is to provide a yielding or spring-mounted stubble-turner to be connected to the beam in front of the plow-point and which will accommodate itself to the upward and downward movements of the point and which will efficiently turn the stubbles, so that the plow may thoroughly cover the same with the furrow-slice.

These and other objects may be attained by means of the construction illustrated in the accompanying drawings, in which—

Figure 1 is a side elevation of a stubble-turner made in accordance with my invention and secured to a broken-away portion of a plow-beam, the turning-rod being also shown broken away. Fig. 2 is a vertical sectional view of the same. Fig. 3 is a detail perspective view of the bearing for the turning-rod.

Referring to the drawings for a more particular description of my invention, the numeral 1 designates a bearing for the turning-rod, said bearing having a tubular portion 2, formed integrally thereon, and perforated lugs 3 4, extending outward at opposite sides of the bearing 1 and in relatively different planes. The bearing 1 is secured to a plow-beam *a* by means of an obliquely-extending washer-plate 5 and bolts 6 7 extending through the lugs 3 4 and through said washer-plate 5; said bolts being provided with suitable nuts 8 for holding the bearing firmly in place upon the beam *a*. Fitted into the tubular portion 2 of the bearing 1 is a spiral spring 9, one end 10 of which extends through the tubular portion 2 and is engaged in any one of a series of notches 11, formed in one end of the tubular portion 2. The opposite end 12 of the spring is bent laterally, and the terminal end is seated in a hole in the turning-rod 13, as at 14. A tube 15 extends through the spiral spring 9, and pivoted within said tube 15 is the right-angular end 16 of the turning-rod 13. Fitted to the end of the portion 16 of the turning-rod is a collar 17 to prevent the turning-rod from withdrawal from the tube 15, and a set-screw 18 is utilized for securing the collar 17 in place. The lower end of the turning-rod 13 may be of any suitable shape desired for the purpose of turning the stubble or weeds.

The operation of my invention may be briefly described as follows: When the stubble-turner is secured upon the side of a plow-beam, the stubble-turner 13 extends in an inclined direction downward to the ground and will ride over inequalities on the surface of the ground, owing to the action of the spring 9 in holding the stubble-turner down to its work. Should it be desired to cut a deep or shallow furrow, the turner-rod will yield and always be in position to perform its service.

My invention is of simple construction, can be readily attached to any plow-beam, is automatic in its operation, and does not interfere with the action of the plow.

Having thus described the invention, what I claim is—

1. A stubble-turner comprising a tubular bearing, means for securing said bearing to a plow-beam, a turner-rod journaled in said bearing and a spring within said bearing for holding the turner-rod in operative position.

2. A stubble-turner comprising a tubular bearing, means for securing said bearing to a plow-beam, a spiral spring mounted within said bearing, a tube within said spiral spring, a turning-rod having an angular upper end mounted in said tube, one end of said spring being secured to the bearing and the opposite end to the downwardly-bent end of the turning-rod, substantially as described.

3. In a stubble-turner, a tubular bearing provided with obliquely-disposed securing-lugs, an obliquely-disposed washer, and bolts for securing said bearing and washer upon the plow-beam, a spring mounted within said bearing, a tube within said spring, one end of said spring being secured in a notch in the bearing, and the opposite end secured to a bent portion of the turning-rod, and a turning-rod mounted within said tube and held in place by a collar and set-screw, substantially as described.

In testimony whereof I affix my signature in presence of two witnesses.

IRVING G. HARKER.

Witnesses:
    WM. LOFTUS,
    JULIUS O. ADLER.